P. W. BOLI.
FEED BAG.
APPLICATION FILED OCT. 12, 1916.
1,229,573.
Patented June 12, 1917.
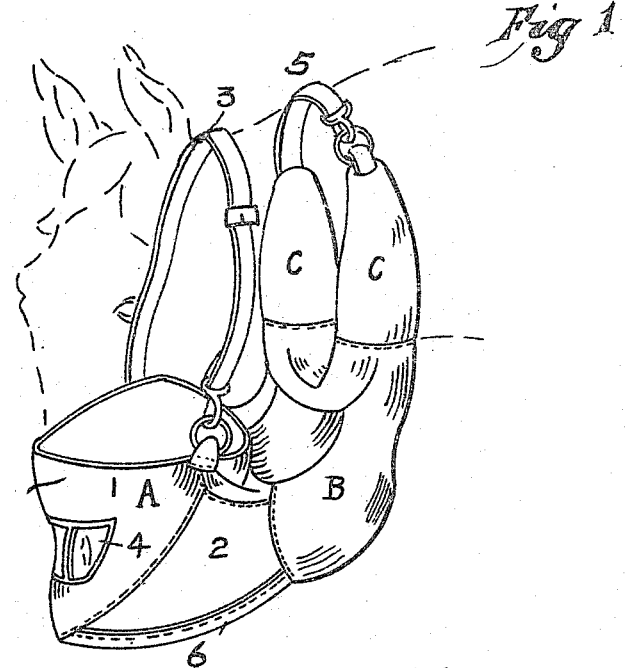
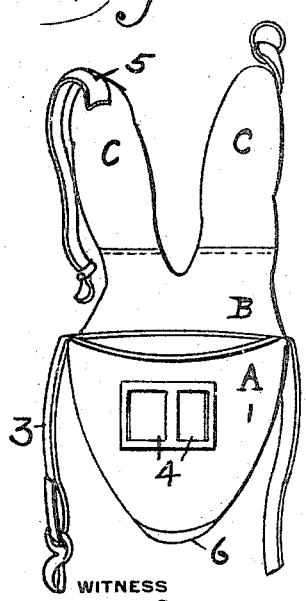
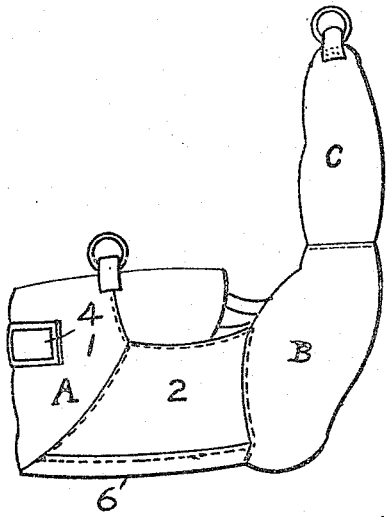
WITNESS
G. F. Dilworth
INVENTOR
Peter W. Boli,
by Edward A. Lawrence.
his attorney.

UNITED STATES PATENT OFFICE.

PETER W. BOLI, OF WILKINSBURG, PENNSYLVANIA.

FEED-BAG.

1,229,573.  Specification of Letters Patent.  Patented June 12, 1917.

Application filed October 12, 1916. Serial No. 125,142.

*To all whom it may concern:*

Be it known that I, PETER W. BOLI, a citizen of the United States, and residing in the borough of Wilkinsburg, in the county of Allegheny and State of Pennsylvania, have invented or discovered new and useful Improvements in Feed-Bags, of which the following is a specification.

My invention consists in a new and improved feed bag for horses.

The types of feed bag now in general use are either mere canvas buckets suspended from the horse's head or buckets provided with an inclined reservoir at their rear from which the feed is fed by gravity into the bottom of the bucket.

In the use of the first named type of feed bag, as the level of the feed lowers in the bucket, the animal tosses his head in an attempt to reach the feed and, as a result, a considerable quantity of the latter is thrown out of the top of the bag and lost. Also the feed is thrown up into the horse's nostrils to his injury. No proper ventilation is possible as open air ports permit the feed to be thrown out and screened ports become coated and clogged with the feed thrown against them and the entrance of air is interrupted.

In the use of the second named type of bag a constant pressure of feed is maintained and the supply is at too fast a rate for proper and healthful consumption.

I overcome these and other well recognized faults by providing a bag wherein the food is fed to the horse's mouth intermittently, when he dips his head to take a fresh mouthful, but when he raises his head while chewing, the supply of feed from the reservoir is interrupted. Thus, while the supply of food lasts, the same is intermittently fed forward when needed and no waste occurs by the ejection of food when the animal tosses his head. I am therefore enabled to provide ventilating ports in the front of the bag at the level of the horse's nostrils without involving waste of food.

I also provide a new and improved bifurcated feed reservoir which extends up at either side of the animal's neck and provides sufficient food capacity and is held at the proper angle to insure gravity feed.

Other novel features of construction of arrangement of parts will appear from the following description.

In the accompanying drawings, Figure 1 is a perspective showing my improved feed bag in use, the animal's head and neck being shown in dotted lines; Fig. 2 is a front elevation of the bag, and Fig. 3 is a side elevation of the same.

The following is a detailed description of the drawings.

The material used is preferably canvas or cotton duck. A is the nose piece of elbow shape having a vertical arm 1 and a rearwardly extending arm 2. The animal's nose is inserted down into the vertical arm and a strap 3 or other support is attached at either side and extends up over the animal's neck to support the bag at the proper height to enable the horse to reach the bottom of the bag with his lips. 4 represents ports or air holes in the front wall of the nose piece to provide proper ventilation.

Connected to the rear end of the arm 2 of the nose piece A is the portion or neck B which, when the bag is in use hangs at an incline so that the food tends to follow down into the nose piece at the rear of the horse's chin. C represents a pair of twin reservoirs which connect with the upper end of the neck B, and, when the bag is in use extend upon either side of the animal's neck and are connected at their upper ends by cross strap 5 which holds the reservoirs in proper position and helps support the bag.

If desired, the reservoirs C may be omitted and the neck B used as a reservoir but I prefer the arrangement shown as providing ample feed capacity and a better inclination.

When the horse dips his head in taking a fresh mouthful, the arm 2 of the nose piece is inclined forwardly, permitting the feed to move along from the neck to the horse's mouth. When the horse raises his head while chewing, said arm 2 becomes horizontal or tips rearwardly, stopping the movement of the feed until the horse again dips his head for another mouthful. Thus the travel of the feed is intermittent and occurs when the animal takes a fresh mouthful.

To maintain the proper contour of the floor of the arm 2 of the nose piece, I prefer to stiffen it with a reinforcement 6 of leather or heavy canvas.

It is evident that no food is wasted as it is fed to the animal's mouth at the proper rate to be consumed and therefore no tossing of the head to dislodge insects will cause any of the food to escape through the ventilating ports or through the top of the arm 1 of the nose piece. The fact that the food is supplied to the animal as needed prevents gulping or too rapid swallowing with its unhealthful results.

The bag is loaded with feed by pouring the latter into the arm 1 of the elbow held in the position shown in Fig. 3, and then tilting up the nose piece until the feed passes out at the rear of the arm 2. The head strap 3 may then be tied around the neck B to compress the latter and prevent the escape of the feed from the rear portion of the bag. The bag may then be tossed into a wagon until needed without danger of spilling or leakage of contents, occupying but little space.

What I desire to claim is:—

A nose bag for animals comprising a vertical nose piece, a horizontal rearwardly extending arm connected to the bottom of the nose piece, stiffening means extending longitudinally of the bottom of the rearwardly extending arm, a neck connected with the rear end of the rearwardly extending arm, two vertically arranged reservoirs connecting with the upper end of the neck, the reservoirs extending one on each side of the animal's neck, a strap connecting the tops of these reservoirs over the animal's neck and a strap holding the vertical nose piece in operative engagement with the animal's nose, the nose piece having air inlets adjacent the animal's nostrils.

Signed at Pittsburgh, Pa., this 10th day of October, 1916.

PETER W. BOLI.

Copies of this patent may be obtained for five cents each, by addressing the "Commissioner of Patents, Washington, D. C."